Sept. 8, 1964  J. L. FISHER  3,148,016
OSCILLOGRAPH RECORDING IMPROVEMENT UTILIZING
DUAL FILAMENT LAMPS
Filed April 12, 1962
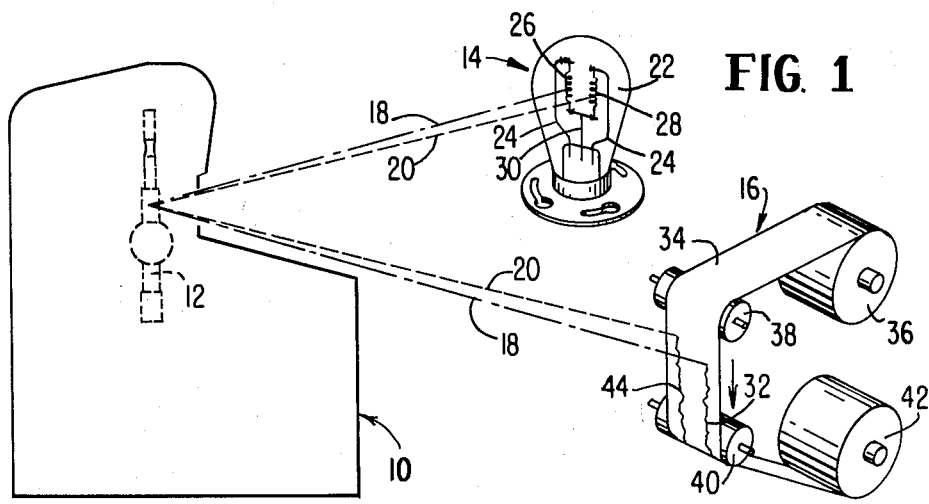
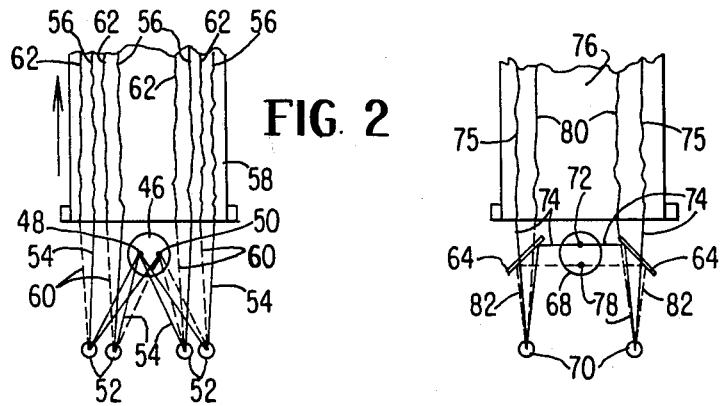
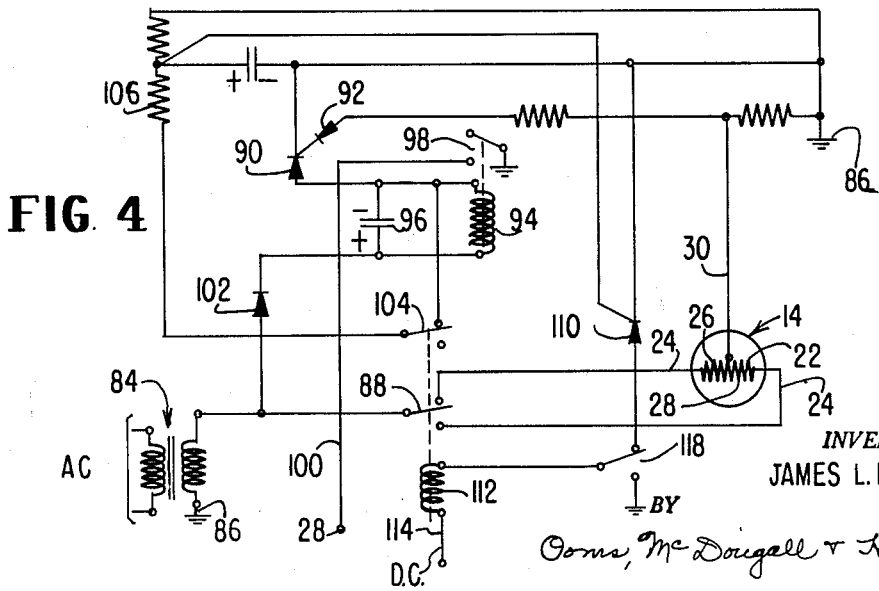
INVENTOR.
JAMES L. FISHER
BY
Ooms, McDougall & Hersh
ATTYS.

— # United States Patent Office 3,148,016
Patented Sept. 8, 1964

3,148,016
OSCILLOGRAPH RECORDING IMPROVEMENT UTILIZING DUAL FILAMENT LAMPS
James L. Fisher, Tulsa, Okla., assignor to Century Electronics and Instruments, Inc., Tulsa, Okla., a corporation of Delaware
Filed Apr. 12, 1962, Ser. No. 187,119
13 Claims. (Cl. 346—109)

This invention relates to oscillographs and more particularly to oscillographs which include a galvanometer or equivalent means capable of reacting in response to particular conditions and adapted to cooperate with a light source to direct information to a recording medium.

The type of light source ordinarily employed in oscillographs generally comprises a filament lamp. These lamps have a limited life and there are occasions where burn-out of the filament will occur while operation of the oscillograph is in progress. This is, of course, extremely inconvenient, since loss of information, even for a short interval of time, may require a rerun or complete abandonment of a given operation.

It is an object of this invention to provide an improved oscillograph recording system having means for preventing loss of information as a result of failure of the light source.

It is an additional object of this invention to provide an improved oscillograph recording system having a light source with an improved filament construction which prevents loss of information during recording, thus avoiding the necessity for reruns or abandonment of a particular operation.

It is a more particular object of this invention to provide an oscillograph recording system which employs a light source having dual filaments arranged in a unique manner whereby failure of one of the filaments will initiate operation of the other in such a way that recording will continue and an indication of the failure will be provided.

It is a further object of this invention to provide an oscillograph recording system which includes a circuit connected to a dual filament lamp in the system, the circuit including means for switching power from one filament to another upon failure of one of the filaments whereby recording of information will continue without interruption, this arrangement providing an indication of the failure.

These and other objects of this invention will appear hereinafter and, for purposes of illustration, but not of limitation, specific embodiments of this invention are shown in the accompanying drawings in which—

FIG. 1 is a diagrammatic view of an oscillograph recording system having a light source characterized by the features of this invention;

FIG. 2 is a diagrammatic view of one arrangement of the elements of an oscillograph recording system which is provided with the features of this invention;

FIG. 3 is a diagrammatic view of an alternative arrangement for the elements of an oscillograph recording system; and FIG. 4 is a diagrammatic illustration of a typical circuit which includes the filament switch means of this invention.

The oscillograph recording system of this invention is designed to include a recording medium in combination with a means, such as a galvanometer, for directing light onto the medium in accordance with conditions being recorded. The light source employed in the system includes a pair of filaments, each of which is adapted to pass light to the galvanometer or other light directing means. A circuit for energizing the filaments is adapted to first power one of the filaments and means are included in the circuit for energizing the other filament in the event that failure of the first filament occurs during recording.

As a distinct feature of this invention, it is preferred to position the filaments with respect to the galvanometer in a manner such that the respective paths of traces produced by the light beams from the filaments on the recording medium are offset with respect to each other. In addition, the filaments are preferably spaced apart within the light source in a manner to prevent contact between the filaments if one of the filaments fails and falls over. The spacing should exceed the possible length of a filament which has failed, or more particularly the spacing between the filaments should exceed the length of that portion of the filament most commonly found to fall over upon failure.

The accompanying drawings provide an illustration of the various elements in an oscillograph recording system which includes the features of this invention. FIG. 1 illustrates a unit 10 which includes a galvanometer 12 adapted to reflect light from a source 14 onto a recording means 16. It will be understood that the invention contemplates systems which employ multiple element galvanometers and, in addition, recording means of various types can be utilized. Various sensitized or photographic recording means capable of providing a permanent or semi-permanent visible record when exposed to a light beam are contemplated. Furthermore, the dual filament lamps can be utilized in combination with a screen which provides a momentary visual trace of the light beam.

The light source 14 is mounted whereby discrete light beams 18 and 20 emanating therefrom are directed to the galvanometer mirrors and then to the recording medium. The light source illustrated comprises a bulb portion 22 enclosing a pair of conductive supports 24 for filaments 26 and 28. A common conductive support 30 for the filaments is insulated with respect to the conductors 24. The filaments 26 and 28 are spaced apart to the extent that upon failure of one of the filaments, the portion thereof which breaks away will not contact the other filament.

As operation of the recording system begins, the filament 26 is energized, producing a light beam 18 which is reflected by means of the galvanometer 12 to provide a trace 32 on the recording medium 16. The recording medium 16 illustrated comprises an elongated photosensitive sheet 34 which unrolls from the roller 36 and passes around guide rollers 38 and 40 and is then rewound on roller 42.

If the filament 26 burns out during the operation, means in the circuit which energizes the lamp are adapted to switch over to filament 28. The filament 28 produces a light beam 20 which is reflected by means of the galvanometer 12 to produce a trace 44 on the sheet 34. It will be noted that the trace 44 is displaced on the sheet 34 with respect to the trace 32. With this arrangement, it will become apparent to one studying the sheet that one filament has failed. However, the information recorded by the second filament is perfectly useful once allowance is made for the displacement of the trace on one axis of the sheet from the position 32 to the displaced position 44.

Since it becomes readily apparent upon viewing the record sheet that failure of one filament has resulted, replacement of the light source before initiating the next operation will be in order. However, the system of this invention eliminates the possibility of losing all or a portion of the data gathering run during which there was filament failure, since the invention provides a built-in means for compensating for such a failure.

FIGS. 2 and 3 illustrate possible arrangements which can be employed in conjunction with this invention. In FIG. 2 the light source 46 with dual filaments 48 and 50 is employed in combination with the multiple element galvanometers 52. The light beams 54 from the filament 48 are reflected by the galvanometers and produce traces 56 on the recording medium 58. If the filament 48 should burn out then, in accordance with the concepts of this invention, the filament 50 would be automatically energized. Light beams 60 produced by this filament then provide traces 62 on the sheet 58.

The traces 62 are offset from the traces 56 whereby a clear indication of filament failure is provided without in any way departing from the accuracy and efficiency of the system. With regard to this arrangement, as well as in the other examples, the discrete light beams are provided as a result of the positioning of the light source in the system. The respective positions of the filaments 48 and 50 serve as a suitable illustration of the manner in which the reflected beams will serve to provide discrete traces on the recording medium. It will be obvious to those skilled in the art that many arrangements are possible, and it will also be apparent that well known optical systems for defining the light beams are available for use in combination with the disclosed arrangements.

In FIG. 3 a pair of mirrors 64 are disposed intermediate a light source 68 and galvanometers 70. The filament 72 is adapted to direct light beams 74 to the mirrors 64 whereby they will be reflected by the mirrors and by the galvanometers to produce traces 75 on the sheet 76. Upon failure of the filament 72, the circuit associated therewith is adapted to energize the filament 78 whereby the traces 80 will be formed on the sheet 76 upon impingement of light beams 82. The positioning of the filaments with respect to the mirrors 64 provides for displacement of the path of traces 80 with respect to the path of traces 74. This provides a visible indication of filament failure without detracting from the dependability of the recording operation.

FIG. 4 illustrates one example of an A.C. circuit which can be associated with a dual filament lamp of the type described. It will be understood that the concepts of this invention are in no way limited to this disclosed example and that D.C. circuits and other known systems, capable of providing the necessary switching from a first filament to a second filament upon failure of the first, are contemplated. It will be appreciated that the switching is preferably automatically effected by the circuitry in order to virtually eliminate a time gap in the recorded information. The use of manual controls, which can be operated upon observation of filament failure, is, however, considered to be within the scope of this invention.

In the illustrated circuit numerals corresponding to those used in FIGURE 1 are employed for purposes of clarity. Thus, there is shown a lamp 14 comprising a bulb portion 22, filaments 26 and 28, conductors 24 leading to these filaments and a common conductor 30. The filament circuit is furnished with A.C. power through the secondary of transformer 84. This circuit is completed through conductor 30 to ground point 86 which corresponds to the return side of the secondary of transformer 84.

In a typical operation, the switch 88 is located in the position shown and, accordingly, the filament 26 is energized and provides a light beam for recording information. As long as the filament 26 is operating properly, a trigger voltage will be applied to silicon controlled rectifier 90 through a common diode 92. This causes the rectifier 90 to fire placing the top end of the coil 94 at ground potential, since the resistance of the rectifier 90 represents all the resistance between this coil and ground 86. A capacitor 96 is charged as the rectifier 90 fires and then discharges to maintain the coil 94 energized during the period in which the rectifier 90 is non-conducting.

When coil 94 is pulled in by this operation, the switch 98 is closed. This switch applies ground to conductor 100 which is connected to means (not shown) for providing an observer with an indication that the filament 26 is operating properly.

If the filament 26 burns out during the operation, a trigger voltage for the rectifier 90 cannot be delivered and the coil 94 will de-energize opening switch 98. The transformer 84 continues to supply voltage to the coil 94. The A.C. voltage from the transformer 86 is rectified at 102 and D.C. voltage is thus applied through switch 104 and to resistor 106 and capacitor 108. After a period of time as established by the time constant of resistor 106 and capacitor 108, this voltage is applied as a gate pulse to silicon controlled rectifier 110. This establishes ground for coil 112 which is connected at its lower end through conductor 114 to a D.C. source.

Energization of the coil 112 reverses the contacts of switches 104 and 88. Switch 104 then breaks the circuit through the resistor 106 and capacitor 108, while switch 88 provides power for filament 28. The coil 94 is energized closing switch 98 in the manner previously described whereby an observer will receive a signal confirming operation of the filament 28.

A switch 118 is provided for connecting ground to coil 112. This switch is adapted to be operated prior to initiation of a recording cycle in order to be certain that the filament 28 is in operating order. Thus, the application of ground through switch 118 energizes coil 112 pulling in switches 104 and 88 permitting a determination of the operability of filament 28.

It will be understood that various modifications can be made in the above described system which provide the characteristics of this invention without departing from the spirit thereof, particularly as defined in the following claims.

I claim:

1. In a recording system of the type including a recording medium and means for directing light onto said medium in accordance with the conditions being recorded, the improvement comprising a light source for said system, said light source including a bulb and a pair of filaments disposed within said bulb adapted to pass light to said directing means whereby traces are produced on said recording medium, a circuit including means for energizing said filaments and means in said circuit for connecting said energizing means to only one of said filaments at a time.

2. A system in accordance with claim 1 wherein said filaments are spaced apart in said light source so that the paths of the traces produced by the respective filaments on said recording medium are offset with respect to each other.

3. In a recording system of the type including a recording medium and means for directing light onto said medium in accordance with the conditions being recorded, the improvement comprising a light source for said system, said light source including a bulb and a pair of filaments disposed within said bulb adapted to pass light to said directing means whereby traces are produced on said medium, a circuit including means for energizing said filaments and switching means in said circuit adapted to initially provide for energization of one of said filaments and operable to switch in response to failure of said one filament to provide for energization of the other filament.

4. A system in accordance with claim 3 wherein said filaments are spaced apart in said light source so that the paths of the traces produced by the respective filaments on said recording medium are offset with respect to each other.

5. A system in accordance with claim 4 wherein the spacing between said filaments exceeds the length of the filaments to prevent contact between filaments when one fails and falls over within said light source.

6. A system in accordance with claim 3 wherein a plurality of said directing means are included in said system whereby a plurality of traces are recorded on said recording medium.

7. In a recording system of the type including a photosensitive recording medium and a galvanometer for directing light onto said medium in accordance with the conditions being recorded, the improvement comprising a lamp for said system, said lamp including a bulb and a pair of filaments disposed within said bulb adapted to pass light to said galvanometer whereby the light is directed to said recording medium for producing traces thereon, a circuit including means for energizing said filaments and switching means in said circuit adapted to initially provide for energization of one of said filaments and operable to switch in response to failure of said one filament to provide for energization of the other filament.

8. A system in accordance with claim 7 wherein said filaments are spaced apart in said lamp so that the paths of the traces produced by the respective filaments on said recording medium are offset with respect to each other.

9. A system in accordance with claim 8 wherein the spacing between said filaments exceeds the length of that portion of the filaments which can break away upon failure thereby preventing contact between filaments when one fails and a portion falls over within said lamp.

10. A system in accordance with claim 7 wherein a plurality of galvanometers are included in said system whereby a plurality of traces are recorded on said recording medium.

11. A system in accordance with claim 7 including at least one mirror interposed between said lamp and said galvanometer, said mirror being adapted to reflect the light toward said galvanometer for ultimate directing of the light to said recording medium.

12. A system in accordance with claim 7 wherein said circuit includes additional switch means adapted to be held closed during operation of one of the filaments and adapted to provide a signal indicating proper operation of said filaments.

13. A system in accordance with claim 7 wherein said circuit includes additional switch means adapted to be operated to provide for energization of said other filament prior to failure of said one filament whereby the operable condition of said other filament can be established prior to initiation of the operation of said system.

References Cited in the file of this patent

UNITED STATES PATENTS

| | | |
|---|---|---|
| 1,510,845 | Haywood | Oct. 7, 1924 |
| 1,800,903 | Ramsey | April 14, 1931 |
| 2,605,446 | Cartun | July 29, 1952 |
| 2,750,575 | Doty et al. | June 12, 1956 |